United States Patent
Hwang et al.

[11] Patent Number: 6,086,949
[45] Date of Patent: Jul. 11, 2000

[54] THIN FILM PROTECTIVE COATING WITH TWO THICKNESS REGIONS

[75] Inventors: Cherngye Hwang; Charles C. H. Lee, both of San Jose; Richard Longstreth White, Los Altos, all of Calif.

[73] Assignee: International Business Machines Corporation, Armonk, N.Y.

[21] Appl. No.: 09/030,643

[22] Filed: Feb. 25, 1998

[51] Int. Cl.⁷ .................................................. B05D 5/12
[52] U.S. Cl. .................... 427/130; 204/192.35; 427/131; 427/259; 427/264; 427/270; 427/272; 427/282; 427/402; 427/468; 427/526; 427/534
[58] Field of Search .................................. 327/130, 131, 327/259, 264, 270, 272, 282, 526, 468, 402, 534; 204/192.35

[56] References Cited

U.S. PATENT DOCUMENTS

| | | | |
|---|---|---|---|
| 4,259,392 | 3/1981 | Suzuki | 428/212 |
| 5,336,531 | 8/1994 | Nakayama et al. | 427/510 |
| 5,356,522 | 10/1994 | Lal et al. | 204/192.15 |
| 5,432,012 | 7/1995 | Lal et al. | 428/610 |
| 5,496,632 | 3/1996 | Yamaguchi et al. | 428/332 |
| 5,520,981 | 5/1996 | Yang et al. | 428/65.5 |
| 5,580,667 | 12/1996 | Lal et al. | 428/610 |

FOREIGN PATENT DOCUMENTS

| | | | |
|---|---|---|---|
| 62-231428 | 10/1987 | Japan | G11B 5/82 |
| 1-263930 | 10/1989 | Japan | G11B 5/72 |
| 2-282926 | 11/1990 | Japan | G11B 5/82 |
| 3-69017 | 3/1991 | Japan | G11B 5/82 |
| 4-341921 | 11/1992 | Japan | G11B 5/82 |
| 5-347023 | of 1993 | Japan | G11B 5/82 |

*Primary Examiner*—Bernard Pianalto
*Attorney, Agent, or Firm*—G. Marlin Knight

[57] ABSTRACT

A thin film disk and a method for producing the disk having an overcoat with two thickness regions. The thicker overcoat region can be used as a start/stop or loading zone and the thinner overcoat region can be used over the data recording area. This provides increased wear resistance while allowing improved magnetic performance through a reduction in the thickness of the overcoat over the data recording area. The dual thickness regions can be formed using different embodiments of the method. One method sputter deposits a relatively thick layer of overcoat material over the entire disk surface, masks off the portion of the disk for the thick layer, etches the unmasked area to reduce or eliminate the overcoat from the unmasked area, then deposits a second relatively thin layer of overcoat material over the entire surface.

27 Claims, 4 Drawing Sheets

THIN FILM PROTECTIVE COATING WITH TWO THICKNESS REGIONS

BACKGROUND OF THE INVENTION

1. Field of the Invention

This invention relates in general to a protective overcoat for data storage disks, and more particularly to a method for producing a disk having an overcoat with two regions of different thickness.

2. Description of Related Art

The demand for increased areal density in magnetic storage pushes thin film disk scientists to reduce the spacing between the magnetic layer on the disk and the magnetic transducer in the slider. Since the protective overcoat on the disk lies between the slider and the magnetic layer its thickness must be minimized without compromising wear and corrosion resistance. Sputtered carbon based thin films, which typically include hydrogen and sometimes nitrogen, have been used extensively within the industry for overcoats. Many other materials have been used or suggested as overcoat materials as well. The overcoats are typically subjected to higher stress when the disk first begins to rotate and when it is slowing to a stop. During these start/stop periods the slider may be in contact with the overcoat. The wear resistance of the overcoat to these and other stresses improves with increased thickness. To improve magnetic characteristics for data storage, protective overcoats have been developed that have a film thickness that is greater in a reserved contact start/stop (CSS) zone. This CSS zone is typically located at the inner diameter of the disk.

While methods for producing these different zones of overcoat thickness have been disclosed, prior techniques produce an unwanted, wide sloping transition between the thicker and thinner zones.

It can be seen that there is a need for a method for producing a protective overcoat that provides a more rapid transition between the thicker overcoat region over the landing zone and the thinner overcoat region over the data recording zone.

It can also be seen that there is a need for a method for producing a protective overcoat that provides increased contact start/stop durability by facilitating an increase in the overcoat over the landing zone while facilitating a reduction in the thickness of the overcoat over the data recording zone.

SUMMARY OF THE INVENTION

The present invention discloses a method for producing a disk having an overcoat with two thickness regions. The thicker overcoat region can be used as the CSS zone and the thinner overcoat region can be used over the data recording area. The dual thickness overcoat produced according to the present invention provides increased contact start/stop durability by facilitating an increase in the overcoat over the landing zone while allowing improved magnetic performance through a reduction in the thickness of the overcoat over the data recording zone.

One embodiment of the invention is a method which includes the steps of depositing a first layer of the overcoat material of a first substantially uniform thickness over entire usable surface of the disk, covering a first zone, e.g. the CSS zone, with a mask to protect the layer over the first zone, etching the sublayer over the second zone of the disk that is not protected by the mask until it is reduced in thickness or removed entirely, removing the mask and depositing a second layer of overcoat material to a second substantially uniform thickness over the both the first and second zones of the disk. A disk coated using this method will have a substantially uniform overcoat thickness in the first zone that is higher than the second zone. The difference in thickness is a function of how much etching is performed and is maximized when the entire first sublayer is etched away. A disk made according to the method may have a CSS zone thickness greater than twice the thickness over the data area.

One way to accomplish the masking in a conventional sputtering system is to place a clamp over the area which is to be protected from etching. If the area is at the inner diameter of the disk, a circular metal clamp of the appropriate size can be placed on the center portion of the disk. The mask comprises an overhang that covers the protected area and need not make contact with the disk.

The sputter etching may use oxygen. A DC or RF bias may be applied to the disk to facilitate the etching.

Other embodiments of the invention use a vacuum deposition apparatus with a collimated beam for deposition or etching. The collimated ion beam can be selectively masked from any portion of the surface by placing a blocking shield in the path of the ions.

DETAILED DESCRIPTION OF THE INVENTION

The following description illustrates specific embodiments of the invention. It is to be understood that other embodiments may be utilized as structural changes may be made without departing from the scope of the present invention.

Figure 2:
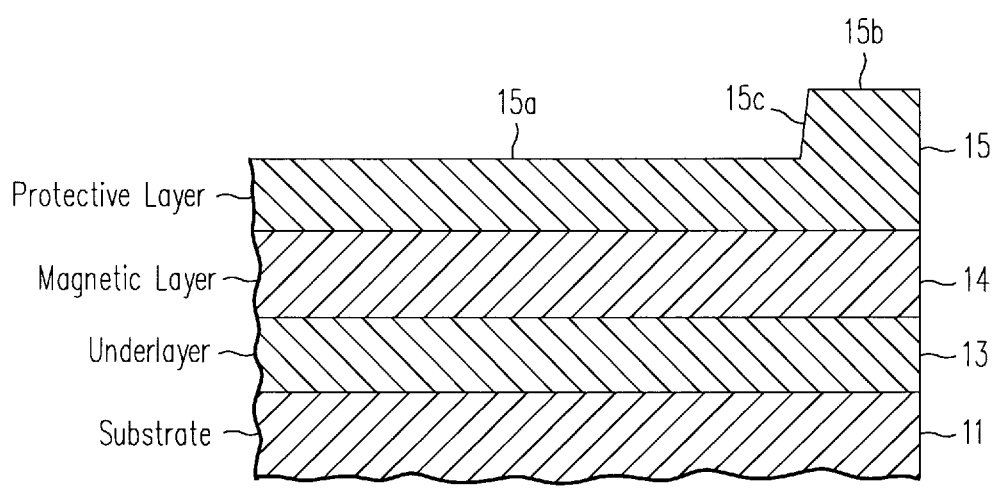
FIG. 2 illustrates a cross-sectional view of a magnetic recording disk embodying the invention.

FIG. 2 illustrates a radial cross-sectional view of the layers of a magnetic recording disk 200 according to the invention. Although the use of the overcoat of the invention is essentially independent of the layers beneath it, a typical thin film disk will be described. The only requirement is that the surface of the layer under the overcoat be such that the overcoat material can adhere. The disk 200 includes a base or substrate 11 which is typically a rigid material such as NiP electroplated on AlMg. The underlayer 13 formed directly on the NiP substrate and is typically Cr or an alloy of Cr. A common alternative disk design uses a nonmetallic substrate such as glass on which a very thin seed layer is deposited prior to the deposition of the underlayer. The magnetic thin film layer 14 is formed on the underlayer. The magnetic layer is typically an alloy of cobalt, but nickel and iron have also been commonly used. The protective layer 15 has two distinct thickness regions 15a, 15b of relatively uniform thickness and a transition region 15c where the thickness changes rapidly from the higher to the lower thickness. The thicker region 15b is shown located at the inner diameter (ID) of the disk where the CSS area would typically be located. The thinner region 15a extends from the outer diameter of the disk over all of the surface not covered by the thicker region. Since the surface of the disk is an annular ring, each of the two regions of the protective layer form annular rings. The range of thicknesses for the initial layer can vary widely and are strongly related to the properties of the overcoat material. For a typical hydrogenated carbon overcoat the first layer would be expected to be from about 30 Å to 200 Å while the second layer would be expected to be about 10 Å to 50 Å. When nitrogen is added to the film thinner layers may be possible. The delta between the first (tricker) layer's thickness and the second layer's thickness should preferably be from 20 Å to 150 Å with the first always being thicker than the second.

Figure 3:
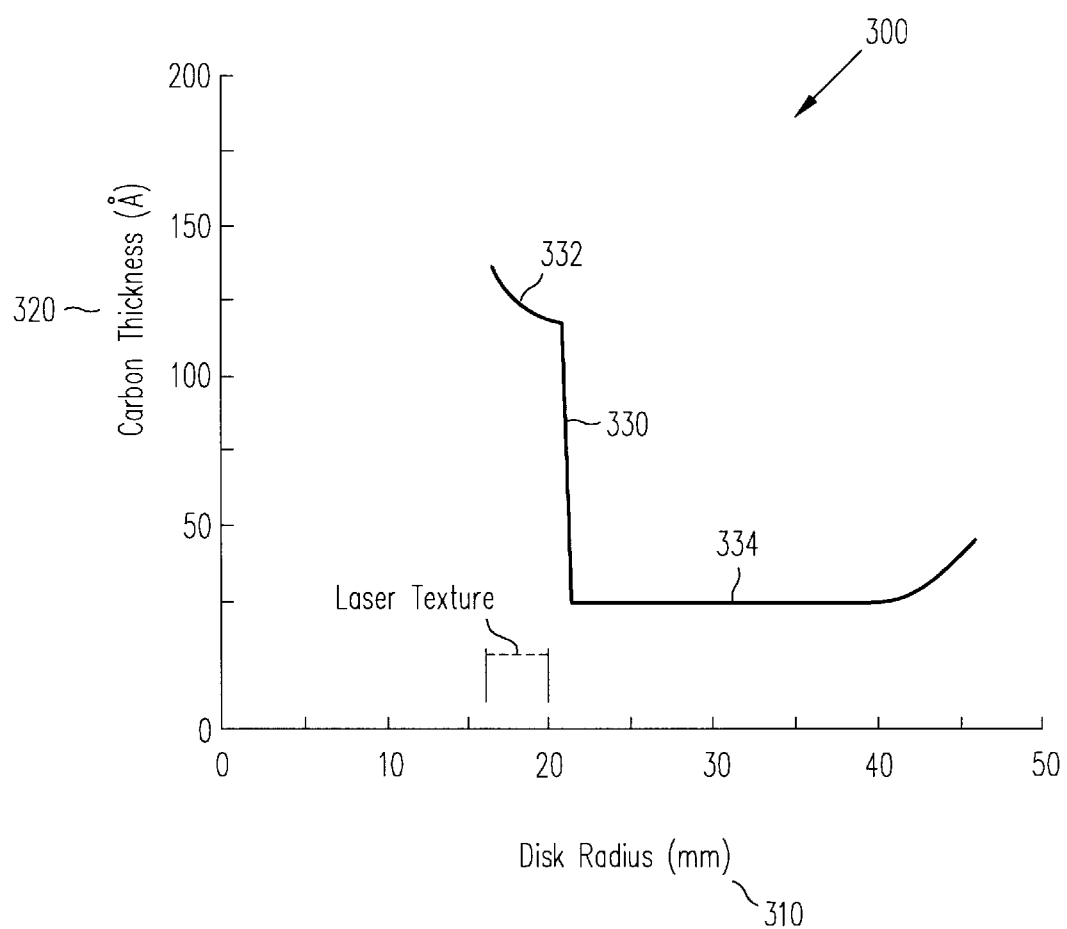
FIG. 3 is a graph of an overcoat thickness embodying the invention.

FIG. 3 is a graph 300 of an thickness of a sample carbon-based overcoat according to the preferred invention. In FIG. 3, the X-axis represents the disk radius 310 and the Y-axis represents the hydrogenated carbon thickness 320. Evident from the graph of FIG. 3 is the sharp transition 330 from 125 Angstrom thickness region of the overcoat in the inner diameter CSS region 332 (from approximately 15 mm to 20 mm as measured radially from the center of the disk) to the approximately 30 Angstrom thickness in thin region extending from 20 mm out to the edge of the disk covering the data zone 334. The transition from the thick region to the thin region occurred in this sample over approximately 2 mm radial distance. The technique of the invention can be expected to yield overcoats in which the transition range is from about 3 mm down to potentially in the Angstrom range should this level of precision be beneficial. Given any particular drive design, there will be a point of diminishing returns after which decreasing the width of the transition region will not improve performance. For current drive designs it is believed that reduction below the millimeter range will not significantly improve performance. The average slope of the thickness in the transition region (as determined by taking arctangent of the delta in thickness divided by the width of the transition zone) ranges upward from $3.8 \times 10^{-5}$ degrees (for 20 Å over 3 mm) toward 90 degrees.

Figure 4:
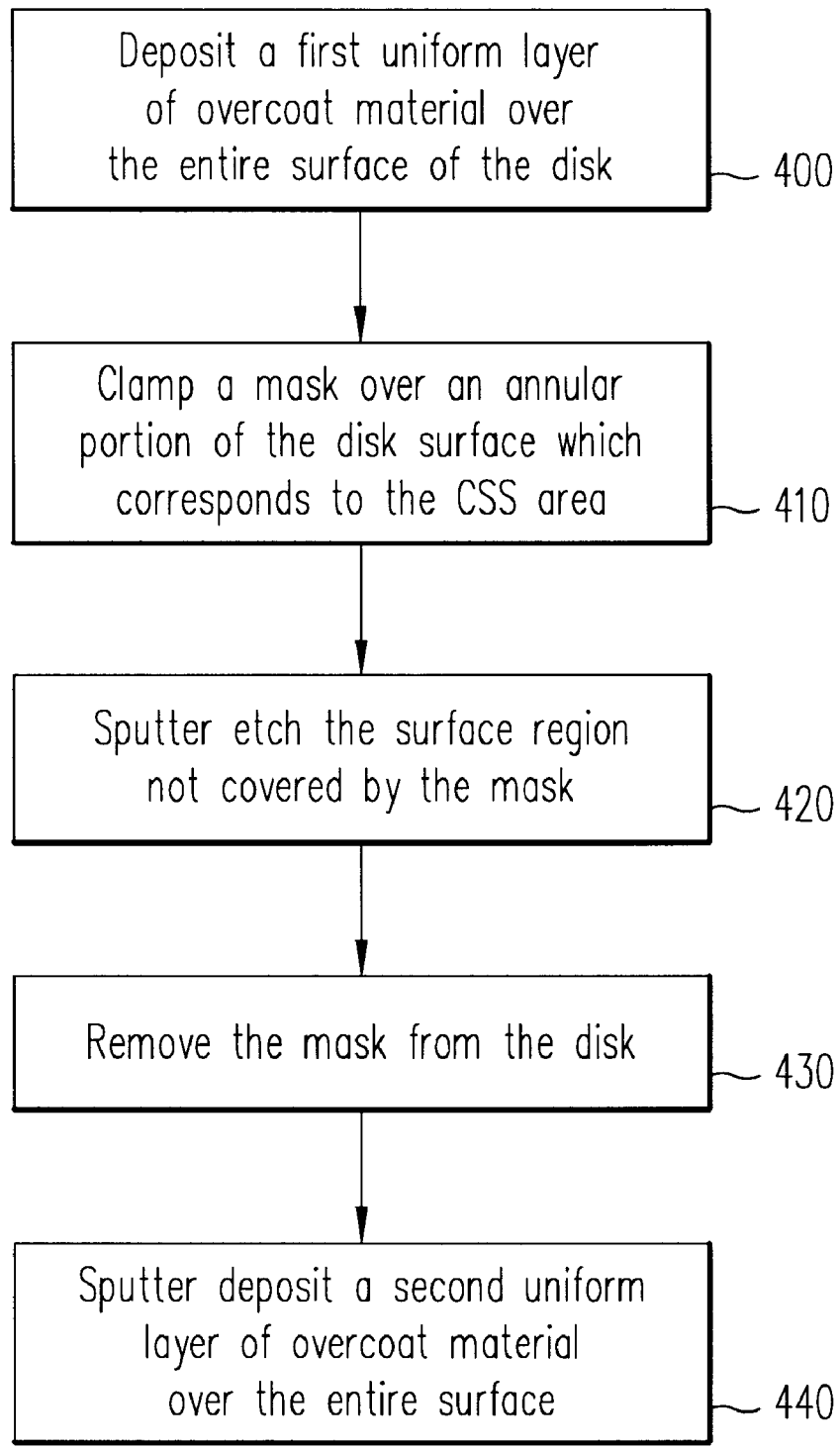
FIG. 4 is a flow chart of a method for producing a disk having an overcoat with two thickness regions according to the present invention.

FIG. 4 illustrates a flowchart for an embodiment of the method of the invention which yields a disk with a thick overcoat layer in the inner start/stop landing zone and a thinner overcoat thickness in the data storage region of the disk. First, an initial layer of uniform carbon thickness is deposited over the entire disk surface 400. The thickness of the overcoat layers are not important for practicing the invention, but for current disks the first layer might be about 100 Å. A mask is then clamped to the inner diameter of the disk 410. The clamping may be performed when the disk is outside of the sputtering station as the disk is moved to a second chamber in the sputtering system or returned to the same chamber. It is also possible to integrate the clamping mechanism into the sputtering system so that the mask could be put on the disk while it is in the chamber. The area covered by the mask corresponds to the location of the CSS area, e.g., an annular ring at the inner diameter (ID) portion of the disk. The radial width of the masked area corresponds to desired width of the CSS area, e.g., on the order of a few millimeters for current disks. If CSS areas are smaller in future disks, the radial width of the masked can be reduced accordingly.

After the mask is clamped in place and the disk is returned to a sputtering station if necessary, the unmasked portion of the disk surface is sputter etched 420. Sputter etching is a well known process which is essentially the reverse of sputter depositing. In order to etch a typical overcoat material such as hydrogenated carbon (C:H) at an acceptable rate a DC or RF bias should be applied to the disk and oxygen should be introduced to the chamber to react with the surface atoms to produce volatile C(O) gases such as carbon monoxide which can be removed from the chamber. A typical bias voltage would be from −50v to −600v. The oxygen should preferably be about 10–20% of the total gas in the chamber which will typically be largely argon. The oxygen is preferably introduced into the system as $O_2$, but any oxygen containing gas which is introduced into the system will result in oxygen being released to etch the surface. The etching process under these condition involves both physical and chemical erosion of the overcoat material in the unprotected region of the disk. Ideally all of the overcoat material outside of the mask should be etched away.

Although it is possible to run the etching for a fixed amount of time and thereby control the amount of etching that takes place, one advantage of using oxygen or an equivalent reactive material to chemically etch an overcoat material such as C:H, is that the process becomes essentially self limiting when all of the overcoat material has been removed in the unmasked area. The oxygen will continue to form volatile compounds with the C:H material until it is depleted and the next layer typically the magnetic material is exposed. Since the magnetic material is typically a material with very different characteristics, e.g., metallic alloys of cobalt, chromium, platinum, tantalum and boron, the chemical etching will either substantially slow or stop.

After the etching is completed the mask is removed 430. The disk will then be placed in a chamber in which additional overcoat material can be sputtered. In this final chamber, a final uniform thin layer of overcoat material is deposited over the entire surface of the disk 440. For current disks this final layer might preferably have a thickness on the order of 30 Å. The deposit of the final layer results in a thicker layer of overcoat material in the CSS area with a thin layer in the data zone, as depicted in FIG. 3. The thicker region is made up of the first sublayer of material, e.g., 100 Å, and the second sublayer, e.g., 30 Å, for a total thickness of, for example, 130 Å.

Figure 5:
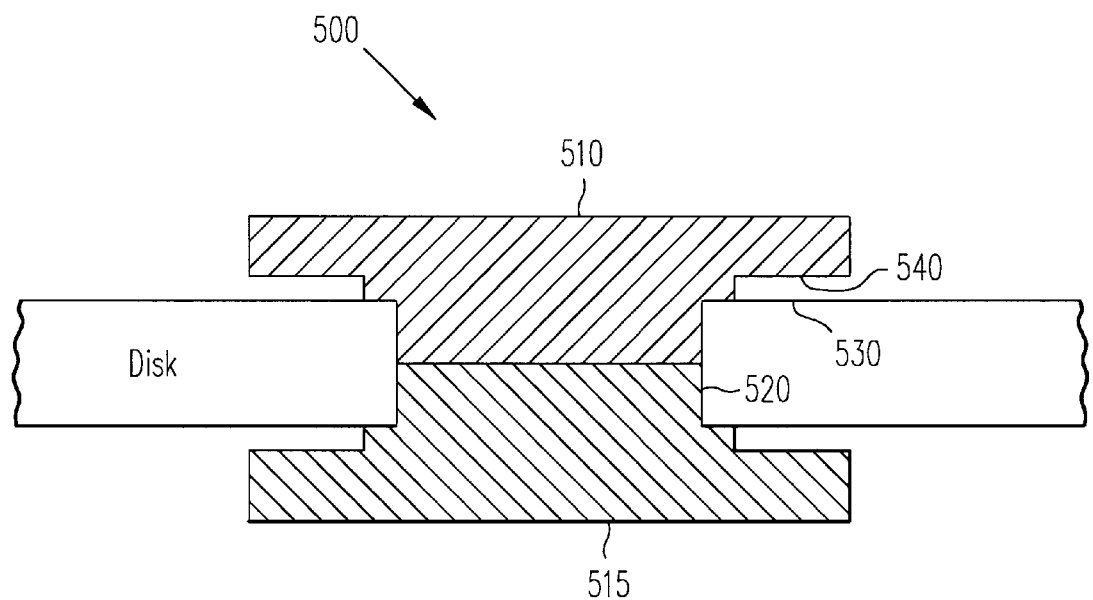
FIG. 5 illustrates a mask used to protect the thick overcoat zone during etching.

FIG. 5 illustrates an embodiment of a mask 500 for masking the CSS area during etching according to the process described with reference to FIG. 4. The mask is essentially circular as viewed perpendicularly to the disk surface. It is formed from two symmetrical separable components 510, 515 which firmly join together through the central hole in the disk when in use. The mask 500 clamps to the innermost diameter 520 of the disk making contact therewith at the inside of the CSS area 530. The mask 500 includes an overhang region 540 which extends over the landing zone 530 with a disk-to-mask spacing on the order of a few millimeters.

The sputtering systems most commonly in use at the present time do not produce collimated streams of ions. The relatively wide angle of attack of the ions arriving at the disk surface make it necessary to place the mask on or near the disk's surface to effectively shield the selected area. An alternative embodiment of the method of the invention uses a shield in a vacuum deposition/etching apparatus which produces a collimated streams of ions. One commercially available vacuum deposition apparatus for producing collimated streams is marketed by Balzers company as a "Carbon Gun" which is an optional substation which can be attached to Balzers' Ferris wheel-like high vacuum deposition system known as the Circulus M12 Hard Disk Coating Machine. The Circulus can accommodate up to twelve substations at one time. The "Carbon Gun" can conveniently be used to produce the protective overcoat of the invention, since its collimated beam allows a simple circular or annular shield to serve as the mask function. Understanding of the details of the Balzers Carbon Gun are not necessary in order to be able to use it in an embodiment of the invention. The Carbon Gun is used by introducing a gas such as acetylene ($C_2H_2$) into the Carbon Gun's chamber be to achieve deposition of a C:H overcoat. Nitrogen could also be added and incorporated into the overcoat. Etching can be accomplished by introducing oxygen into the chamber. The Carbon Gun ionizes some of the gas atoms/molecules and creates relatively linear lines of force acting on the ions to direct them into a collimated stream aimed at the disk. Once the ions strike the surface of the disk the chemical and physical actions are essentially the same as in traditional sputtering systems.

Figure 6:
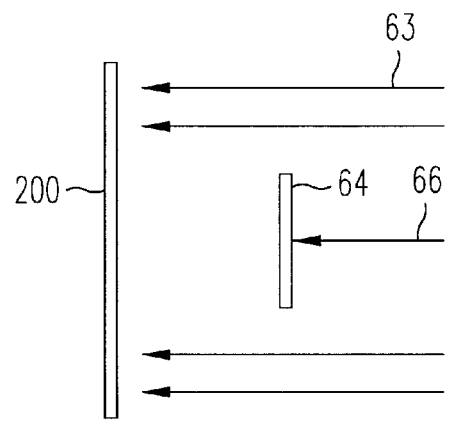
FIG. 6 is a simplified illustration of use of a shield in a collimated ion beam system to selectively deposit regions of an overcoat on a disk according to the present invention.

FIG. 6 illustrates from a side view the relationships inside of a vacuum chamber with collimated ion flow. The disk 200 with the magnetic film, etc. is oriented with the planar surface perpendicular to direction of the ion column 63. In one alternative embodiment the method of the invention, a collimated ion source is used for etching step. In this embodiment a circular (or annular) shield 64 is placed in the path of the ions 66 which would otherwise strike the substrate in the CSS area. If the ions result in etching of the previously deposited first layer of overcoat material, e.g. oxygen ions, then the effect of the shield is to mask a selected area (e.g. the CSS area) from the etching just as the clamped mask does in a traditional sputtering system described above. Thus, in one alternative embodiment of the method of FIG. 4, the steps of attaching the mask, sputter etching and removing the mask are replaced by a single step of etching the overcoat outside of the CSS area in a collimated ion beam system with a shield which blocks the etching ions such as oxygen from the CSS area.

In another embodiment of the method, a collimated ion source can be used to differentially deposit the overcoat material. This can be done by placing a shield/mask, e.g. an annular ring of material in the ion path. The ions passing through a hole in the shield positioned in front of the CSS area, for example, would result in the overcoat material being deposited in the CSS area but blocked from the rest of the disk, i.e., the data area. In this embodiment, the overcoat would be deposited in two steps. The order does not matter, but one of the steps deposits the thicker layer over the CSS area using a collimated ion stream with the shield to protect the data area and the other step deposits the thinner overcoat preferably over the data area and the CSS area, i.e. the entire disk, using no shield. The deposition of the thinner layer can be performed by traditional sputtering or with a collimated ion stream.

Another embodiment of the invention can be used for disks to be installed in drives which use the load/unload technique for removing the heads/sliders from the disks when not in use. While load/unload drives do not have a CSS zone, they may nevertheless benefit from having a thicker overcoat region over the region where the heads/sliders are released. This "loading zone" is an area where there is a increased potential for collisions with the disk surface. Since the loading zone is typically at the outer diameter (OD) of the disk, the thicker region of the overcoat should likewise be at the OD. The loading zone is comparable in size to a CSS zone, e.g. 2–3 mm. The methods described above for the thicker ID area can be used for thicker OD area by modifying the shields. Using a collimated ion stream, the thicker region at the OD can be implemented by using an annular shield which blocks the etching ion stream from the OD area in one embodiment. In another embodiment a circular or annular shield can be used to block the deposition ions from the data area while allowing them to be directed to the loading zone at the OD.

The thin film disk made according to the invention can be used for storing data in typical disk drives using either magnetoresistive or inductive heads and can be used in contact recording or with flyable heads. The read/write head is positioned over the rotating disk in the standard manner to either record or read magnetic information.

Figure 1:
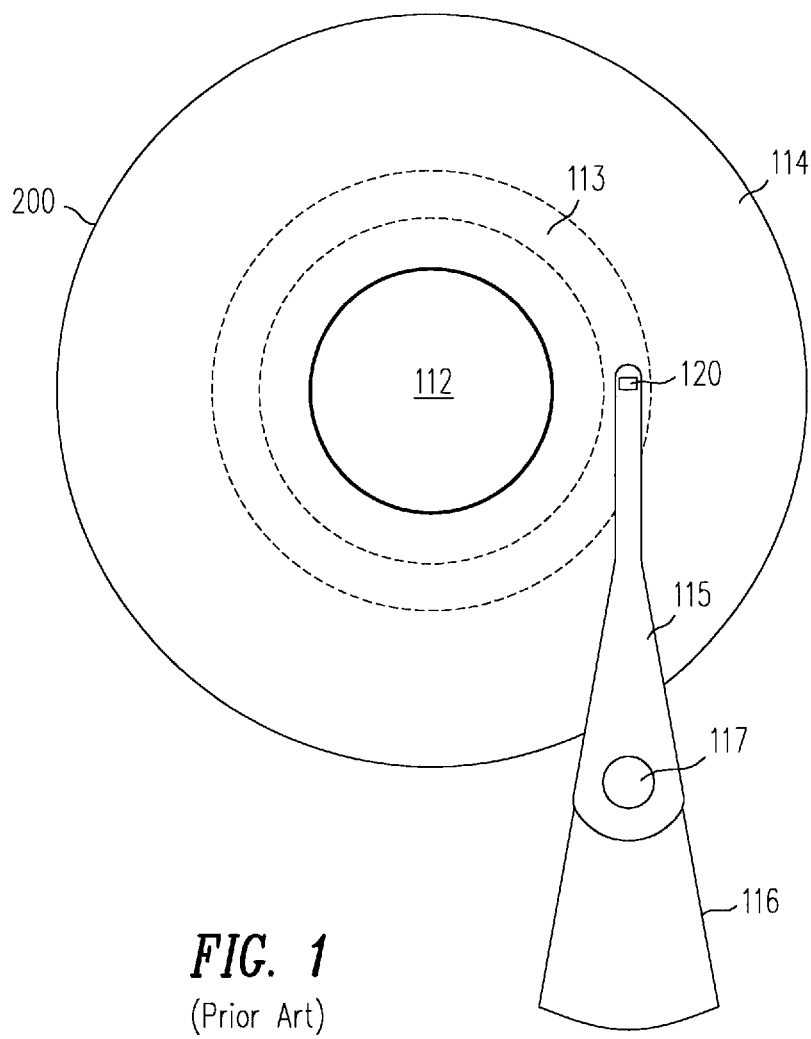
FIG. 1 illustrates a prior art disk drive in which the invention can be used.

The invention described herein can be used with virtually any prior art disk drive. FIG. 1 is a top view illustrating one type of prior art disk drive with a rotary actuator useful in practicing the present invention. The system comprises one or more magnetic recording disks 200 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcing path across the disks allowing the heads to be positioned to read and write magnetic information from circular tracks formed in the data area 114 which is coated with the thin films which will be described in more detail below. Electrical signals to and from the heads and the VCM are carried by a flex cable to the drive electronics (not shown). When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. The width of the CSS area on current drives is about three millimeters. It is also known to remove the sliders from the disks during nonoperating periods using an unload ramp. Although the disk drive has been described with air bearing sliders the disk of the present invention may easily be used in other storage devices having near contact, or contact recording sliders.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for producing a data storage disk having a thin film overcoat with two thickness regions, comprising the steps of:

depositing a first overcoat layer of a first thickness over an annular surface of the disk comprising a first zone and a second zone with the first and second zones being concentric annular zones;

covering the first zone with a mask or shield to protect the first overcoat layer over the first zone;

etching the overcoat layer over the second zone of the disk; and depositing a second overcoat layer of a second thickness over the first and second zones of the disk.

2. The method of claim 1 wherein the first thickness is larger than the second thickness.

3. The method of claim 2 wherein the first thickness is at least twice the second thickness.

4. The method of claim 2 wherein the second overcoat layer is composed of a carbon-based material of a thickness from about 10 Å to 50 Å.

5. The method of claim 2 wherein a region, where the first zone adjoins the second zone, is a transition region in which the thickness of the overcoat changes rapidly and wherein the transition region is less than three millimeters wide as measured radially.

6. The method of claim 2 wherein the first overcoat layer is composed of a carbon-based material of a thickness from about 30 Å to 200 Å.

7. The method of claim 1 wherein the first zone is located nearer to a center of the disk than the second zone.

8. The method of claim 1 wherein the step of covering the first zone with a mask or shield further comprises the step of clamping two parts of the mask or shield together through a central hole in the disk.

9. The method of claim 8 wherein the clamping step further comprises the step of moving the mask or shield into contact with the surface of the disk.

10. The method of claim 9 wherein the mask or shield comprises an overhang that is held above the surface of the disk.

11. The method of claim 1 wherein the etching step further comprises the step of applying a voltage bias to the disk.

12. The method of claim 11 wherein the step of applying a bias further comprises the step of applying a DC voltage bias to the disk from about −50v to −600v.

13. The method of claim 11 wherein the step of applying a bias further comprises the step of applying an RF voltage bias to the disk from about −50v to −600v.

14. The method of claim 1 wherein the etching step further comprises the step of exposing the disk to oxygen.

15. The method of claim 14 wherein the etching step further comprises the step of removing carbon and oxygen containing gases from a chamber in which the disk is being etched.

16. The method of claim 14 wherein the etching step further comprises the step of applying a voltage bias to the disk from −50v to −600v.

17. The method of claim 16 wherein the etching step continues until the first overcoat layer has been completely removed from at least a portion of the second zone.

18. The method of claim 1 wherein the etching step continues until the first overcoat layer has been completely removed from at least a portion of the second zone.

19. The method of claim 1 wherein the etching step further comprises the step of directing a collimated ion stream onto the second zone of the disk that is not protected by the mask or shield.

20. The method of claim 19 wherein the collimated ion stream includes oxygen ions.

21. A method for producing a data storage disk having a thin film overcoat with two thickness regions, comprising the steps of:

depositing a first overcoat layer of a first thickness over an annular surface of the disk comprising a first zone and a second zone with the first and second zones being concentric annular zones;

etching the overcoat layer over the second zone of the disk using a collimated ion stream while shielding the first zone from the ion stream; and depositing a second overcoat layer of a second thickness over the first and second zones of the disk.

22. The method of claim 21 wherein the collimated ion stream includes oxygen.

23. The method of claim 21 wherein the shielding is performed by placing a circular shield between an ion source and the disk and not in contact with the disk.

24. A method for producing a data storage disk having a thin film overcoat with two thickness regions, comprising the steps of:

depositing a first overcoat layer of a first thickness over a first annular zone an using a collimated ion stream while shielding a second annular zone from the ion stream; and depositing a second overcoat layer of a second thickness over the first and second zones of the disk.

25. The method of claim 24 wherein the shielding is performed by placing an annular or circular shield between an ion source and the disk and not in contact with the disk.

26. The method of claim 24 wherein the overcoat material is carbon based.

27. The method of claim 24 wherein the thickness of the second overcoat layer is less than fifty Angstroms.

* * * * *